US012812268B2

(12) United States Patent
Yamazaki et al.

(10) Patent No.: US 12,812,268 B2
(45) Date of Patent: Nov. 24, 2026

(54) IMAGING ELEMENT AND IMAGING DEVICE

(71) Applicant: NIKON CORPORATION, Tokyo (JP)

(72) Inventors: Hiroki Yamazaki, Toda (JP); Fumiki Nakamura, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 120 days.

(21) Appl. No.: 18/284,604

(22) PCT Filed: Mar. 29, 2022

(86) PCT No.: PCT/JP2022/015318
§ 371 (c)(1),
(2) Date: Nov. 16, 2023

(87) PCT Pub. No.: WO2022/210660
PCT Pub. Date: Oct. 6, 2022

(65) Prior Publication Data
US 2024/0163581 A1 May 16, 2024

(30) Foreign Application Priority Data
Mar. 31, 2021 (JP) ................................ 2021-061148

(51) Int. Cl.
*H04N 25/766* (2023.01)
*H04N 23/71* (2023.01)
(Continued)

(52) U.S. Cl.
CPC ........... *H04N 25/766* (2023.01); *H04N 23/71* (2023.01); *H04N 25/47* (2023.01); *H04N 25/53* (2023.01); *H04N 25/771* (2023.01)

(58) Field of Classification Search
CPC ...... H04N 25/766; H04N 23/71; H04N 25/47; H04N 25/53; H04N 25/771; H04N 25/704;
(Continued)

(56) References Cited

U.S. PATENT DOCUMENTS 10,514,526 B2 * 12/2019 Ishii ....................... H04N 25/77
11,533,437 B2 * 12/2022 Sakurabu ............. H04N 23/651
(Continued)

FOREIGN PATENT DOCUMENTS

JP 2008-219737 A 9/2008
JP 2011-030097 A 2/2011
(Continued)

OTHER PUBLICATIONS

Jun. 28, 2022 International Search Report issued in International Patent Application No. PCT/JP2022/015318.
(Continued)

*Primary Examiner* — Lin Ye
*Assistant Examiner* — Chan T Nguyen
(74) *Attorney, Agent, or Firm* — Oliff PLC

(57) ABSTRACT

An imaging element includes: a first substrate including a plurality of pixels configured to output a signal based on charge obtained by photoelectric conversion; a second substrate including a conversion unit configured to convert at least a first signal output from a first pixel among the plurality of pixels and a second signal output from the first pixel after the first signal into digital signals; and a third substrate including a computing unit including a calculating unit configured to calculate evaluation values of first and second images generated on the basis of the first and second signals converted into digital signals by the conversion unit and a selecting unit configured to select data of at least one of the first and second images to be output to an outside on
(Continued)

the basis of the evaluation values of the first and second images.

34 Claims, 11 Drawing Sheets

(51) Int. Cl.
*H04N 25/47* (2023.01)
*H04N 25/53* (2023.01)
*H04N 25/771* (2023.01)

(58) Field of Classification Search
CPC ........ H04N 25/00; H04N 25/75; H04N 25/76; H04N 25/78; H04N 25/79
USPC .......................................................... 348/308
See application file for complete search history.

(56) References Cited

U.S. PATENT DOCUMENTS

2009/0153666 A1* 6/2009 Takeuchi ................. G02B 7/28 348/169
2011/0025874 A1 2/2011 Tamaoki
2012/0262606 A1* 10/2012 Yagyu .................. H04N 5/2621 348/222.1
2021/0176406 A1* 6/2021 Kawai .................... H04N 25/41
2021/0314486 A1* 10/2021 Hasegawa ................ G02B 7/08
2021/0337128 A1* 10/2021 Cui ...................... H04N 23/672

FOREIGN PATENT DOCUMENTS

JP WO2020090509 * 5/2020 ............. H04N 25/79
WO 2020/090509 A1 5/2020
WO 2020/137663 A1 7/2020

OTHER PUBLICATIONS

Jun. 28, 2022 Written Opinion issued in International Patent Application No. PCT/JP2022/015318.
Jan. 30, 2025 Extended Search Report issued in European Patent Application No. 22780871.4.
Dec. 2, 2025 Office Action issued in Japanese Patent Application No. 2025-016739.
Sep. 1, 2025 Office Action issued in European Patent Application No. 22780871.4.

* cited by examiner

IMAGING ELEMENT AND IMAGING DEVICE

TECHNICAL FIELD

The present invention relates to an imaging element and an imaging device.

Priority is claimed on Japanese Patent Application No. 2021-061148, filed Mar. 31, 2021, the content of which is incorporated herein by reference.

BACKGROUND ART

Data of an image captured by an image sensor is subjected to image processing in an external circuit called an image processing engine. As the data of the image sent from the image sensor to an external circuit or the like increases, the processing time for outputting data from the image sensor becomes longer.

CITATION LIST

Patent Document

[Patent Document 1]

Japanese Unexamined Patent Application, First Publication No. 2011-30097

SUMMARY OF INVENTION

An imaging element according to a first aspect of the present invention includes a first substrate including a plurality of pixels configured to output a signal based on charge obtained by photoelectric conversion, a second substrate including a conversion unit configured to convert at least a first signal output from a first pixel among the plurality of pixels and a second signal output from the first pixel after the first signal into digital signals, and a third substrate including a computing unit including a calculating unit configured to calculate an evaluation value of a first image generated on the basis of the first signal converted into a digital signal by the conversion unit and an evaluation value of a second image generated on the basis of the second signal converted into a digital signal by the conversion unit and a selecting unit configured to select data of at least one of the first image and the second image to be output to an outside on the basis of the evaluation value of the first image and the evaluation value of the second image.

An imaging device according to a second aspect of the present invention includes the imaging element according to the first aspect.

BRIEF DESCRIPTION OF DRAWINGS

FIGS. 6(*b*) to 6(*e*) are diagrams illustrating images acquired during a full-press operation.

FIGS. 6(*f*) to 6(*i*) are diagrams schematically illustrating an amount of image shift between a pair of images acquired by a pixel having a photoelectric conversion unit for focus detection when the images illustrated in FIGS. 6(*b*) to 6(*e*) are captured.

FIGS. 8(*b*) to 8(*e*) are diagrams illustrating images acquired during a full-press operation.

FIGS. 8(*f*) to 8(*i*) are diagrams schematically illustrating the amount of image shift between a pair of images acquired by a pixel having a photoelectric conversion unit for focus detection when the images illustrated in FIGS. 8(*b*) to 8(*e*) are captured.

FIGS. 10(*b*) to 10(*e*) are diagrams illustrating images acquired during a full-press operation.

FIG. 10(*f*) is a diagram schematically illustrating a difference in data of the images illustrated in FIG. 10(*b*) and FIG. 10(*c*).

FIG. 10(*g*) is a diagram schematically illustrating a difference in data of the images illustrated in FIG. 10(*c*) and FIG. 10(*d*).

FIG. 10(*h*) is a diagram schematically illustrating a difference in the data of the images illustrated in FIG. 10(*d*) and FIG. 10(*e*).

DESCRIPTION OF EMBODIMENTS

Hereinafter, embodiments for carrying out the invention will be described with reference to the drawings.

First Embodiment

<Configuration of Imaging Device>

Figure 1:
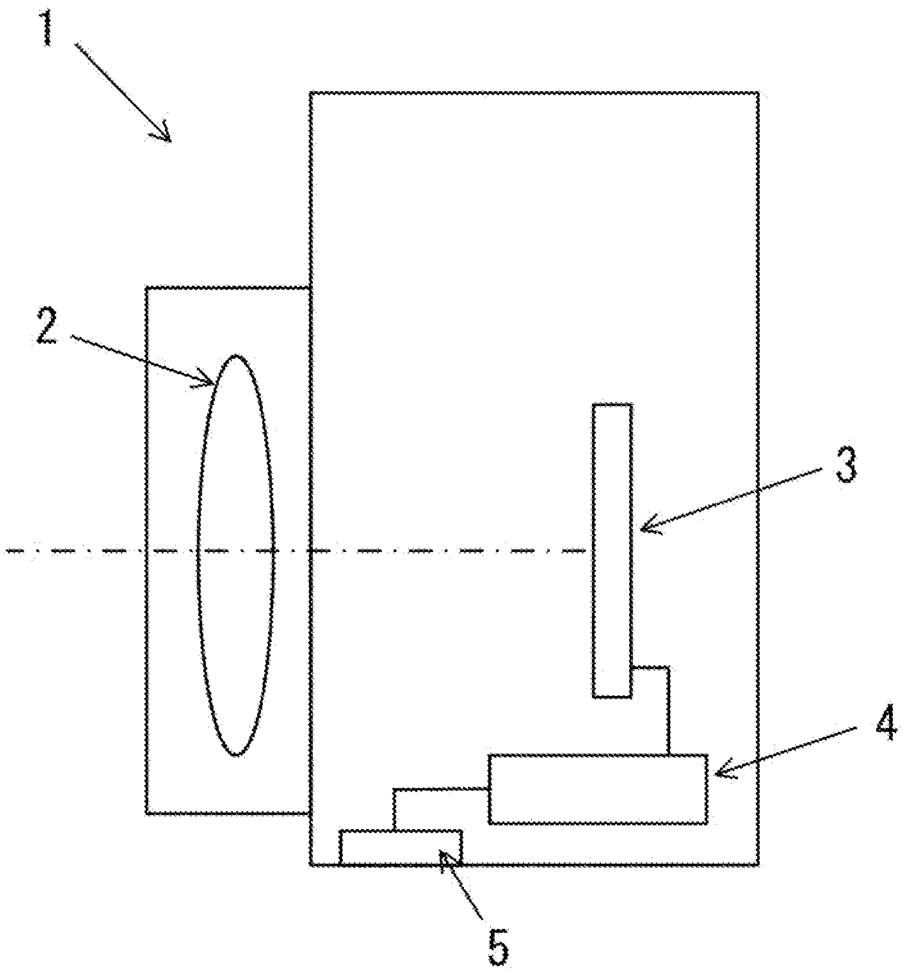
FIG. 1 is a block diagram illustrating a configuration of an imaging device according to an embodiment.

FIG. 1 is a block diagram illustrating a configuration of an imaging device equipped with an imaging element according to an embodiment. The imaging device 1 includes an image-capturing optical system 2, an imaging element 3, and a control unit 4, and is configured to be detachably equipped with a storage medium 5 such as a memory card. The imaging device 1 is, for example, a camera. The image-capturing optical system 2 forms a subject image on the imaging element 3. The imaging element 3 captures the subject image formed by the image-capturing optical system 2 and generates an image signal. The imaging element 3 is, for example, a CMOS image sensor. The control unit 4 outputs a control signal to the imaging element 3 to control an operation of the imaging element 3. The control unit 4 also functions as an image generation unit that performs a variety of image processing on the image signal output from the imaging element 3 and generates data of an image. The generated data of the image is recorded in the storage medium 5 in a predetermined file format.

The image-capturing optical system 2 may be configured to be attachable to and detachable from the imaging device 1.

<Cross-Sectional Structure of Imaging Element>

Figure 2:
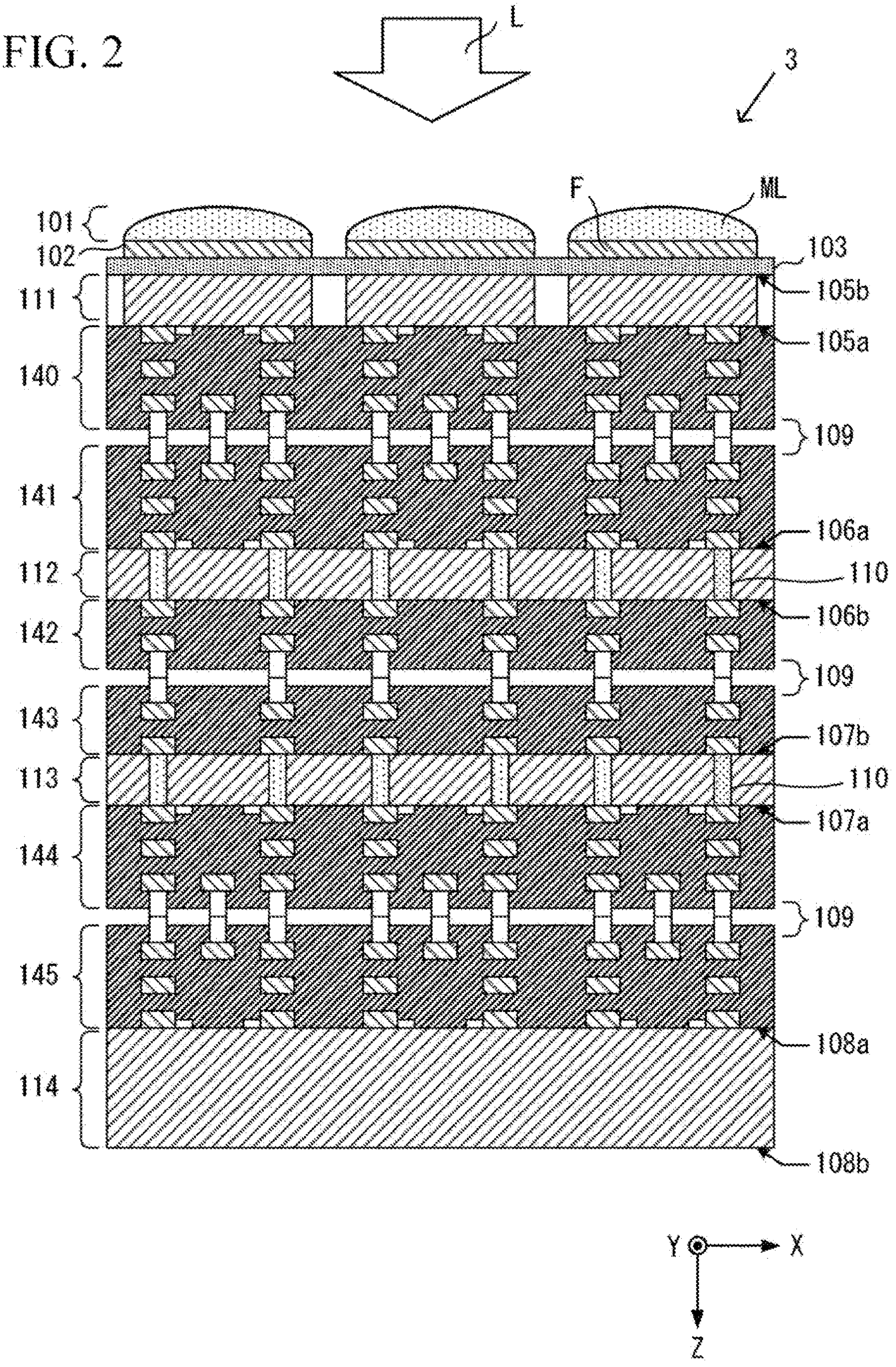
FIG. 2 is a diagram illustrating a cross-sectional structure of an imaging element.

FIG. 2 is a diagram illustrating a cross-sectional structure of the imaging element 3 of FIG. 1. The imaging element 3 shown in FIG. 2 is a back-side illuminated imaging element. The imaging element 3 includes a first substrate 111, a second substrate 112, a third substrate 113, and a fourth substrate 114. Each of the first substrate 111, the second substrate 112, the third substrate 113, and the fourth substrate 114 is configured of a semiconductor substrate or the like. The first substrate 111 is stacked on the second substrate 112 via a wiring layer 140 and a wiring layer 141. The second substrate 112 is stacked on the third substrate 113 via a wiring layer 142 and a wiring layer 143. The third substrate 113 is stacked on the fourth substrate 114 via a wiring layer 144 and a wiring layer 145.

Incident light L shown by a white arrow is incident in a positive direction of a Z-axis. Further, as shown in coordinate axes, a right direction on the drawing perpendicular to the Z-axis is a positive direction of an X-axis, and a forward direction on the drawing orthogonal to the Z-axis and the X-axis is a positive direction of a Y-axis. In the imaging element 3, the first substrate 111, the second substrate 112, the third substrate 113, and the fourth substrate 114 are stacked in a direction in which the incident light L is incident.

The imaging element 3 further includes a microlens layer 101, a color filter layer 102, and a passivation layer 103. The passivation layer 103, the color filter layer 102, and the microlens layer 101 are stacked in order on the first substrate 111.

The microlens layer 101 has a plurality of microlenses ML. The microlenses ML condense the incident light onto a photoelectric conversion unit which will be described below. The color filter layer 102 has a plurality of color filters F. The passivation layer 103 is configured of a nitride film or an oxide film.

The first substrate 111, the second substrate 112, the third substrate 113, and the fourth substrate 114 respectively have first surfaces 105*a*, 106*a*, 107*a*, and 108*a* on which gate electrodes and gate insulating films are provided, and second surfaces 105*b*, 106*b*, 107*b*, and 108*b* that are different from the first surfaces. Furthermore, various elements such as transistors are provided on the first surfaces 105*a*, 106*a*, 107*a*, and 108*a*, respectively. The wiring layers 140, 141, 144, and 145 are stacked and provided on the first surface 105*a* of the first substrate 111, the first surface 106*a* of the second substrate 112, the first surface 107*a* of the third substrate 113, and the first surface 108*a* of the fourth substrate 114, respectively. Furthermore, the wiring layers (inter-substrate connection layers) 142 and 143 are stacked and provided on the second surface 106*b* of the second substrate 112 and the second surface 107*b* of the third substrate 113, respectively. The wiring layers 140 to 145 are layers including a conductive film (a metal film) and an insulating film, and each has a plurality of wirings, vias, and the like arranged therein.

The elements on the first surface 105*a* of the first substrate 111 and the elements on the first surface 106*a* of the second substrate 112 are electrically connected by connection parts 109 such as bumps and electrodes via the wiring layers 140 and 141. Similarly, the elements on the first surface 107*a* of the third substrate 113 and the elements on the first surface 108*a* of the fourth substrate 114 are electrically connected by connection parts 109 such as bumps and electrodes via the wiring layers 144 and 145. Further, the second substrate 112 and the third substrate 113 have a plurality of through electrodes 110. The through electrodes 110 of the second substrate 112 connect circuits provided on the first surface 106*a* and the second surface 106*b* of the second substrate 112 to each other, and the through electrodes 110 of the third substrate 113 connect circuits provided on the first surface 107*a* and the second surface 107*b* of the third substrate 113 to each other. The circuits provided on the second surface 106*b* of the second substrate 112 and the circuits provided on the second surface 107*b* of the third substrate 113 are electrically connected by the connection parts 109 such as bumps and electrodes via the inter-substrate connection layers 142 and 143.

In the embodiment, although the case in which the first substrate 111, the second substrate 112, the third substrate 113, and the fourth substrate 114 are stacked is illustrated, the number of stacked substrates may be greater or smaller than in the embodiment.

Further, the first substrate 111, the second substrate 112, the third substrate 113, and the fourth substrate 114 may be referred to as a first layer, a second layer, a third layer, and a fourth layer, respectively.

<Example of Configuration of Imaging Element>

Figure 3:
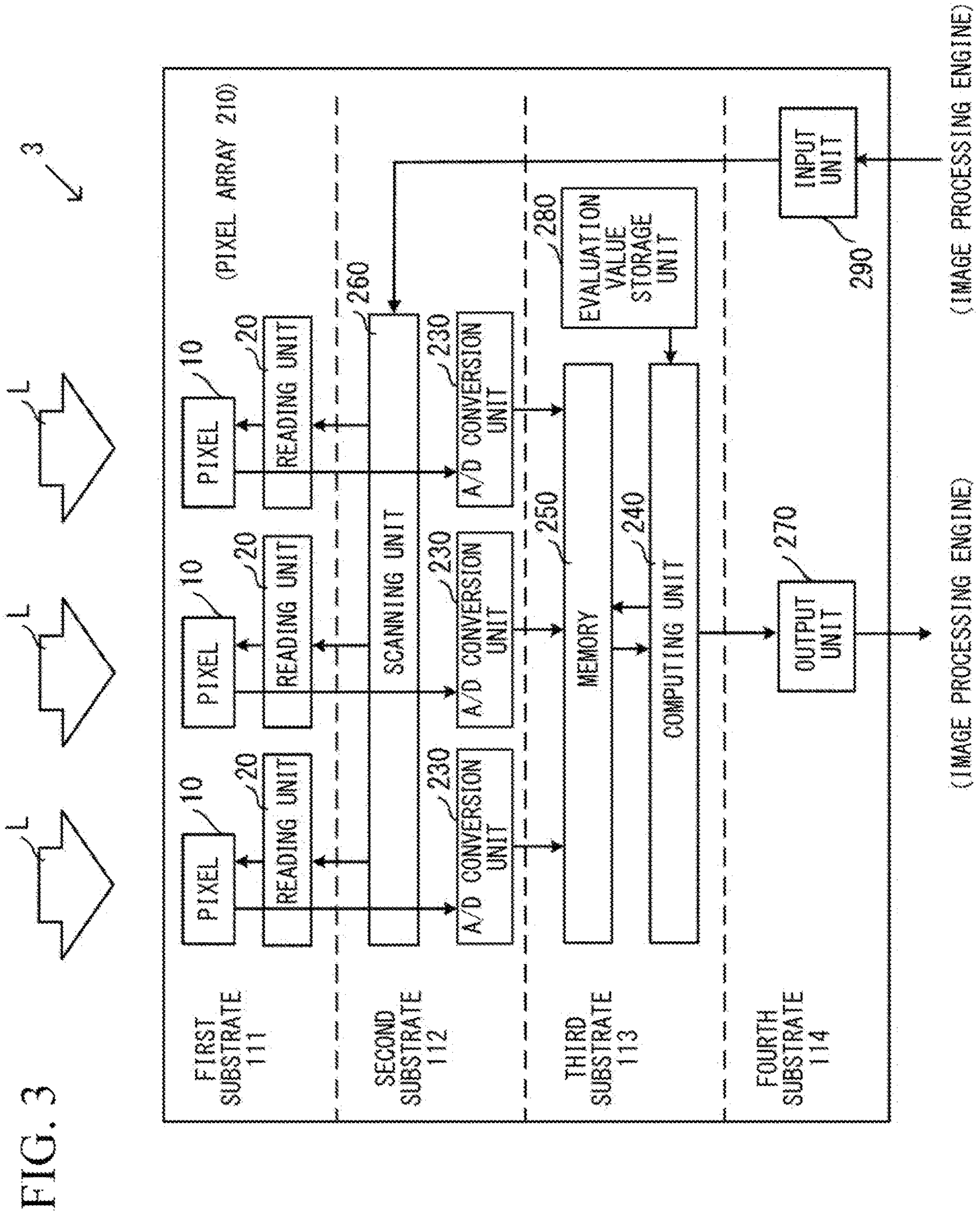
FIG. 3 is a block diagram illustrating a configuration of each layer of a first substrate to a fourth substrate in the imaging element.

FIG. 3 is a block diagram illustrating a configuration of each layer of the first substrate 111 to the fourth substrate 114 in the imaging element 3 according to the embodiment. The first substrate 111 includes, for example, a plurality of pixels 10 disposed two-dimensionally and a signal reading unit 20 (referred to as a pixel array 210). The pixels 10 are arranged side by side in an X-axis direction (a row direction) and a Y-axis direction (a column direction) shown in FIG. 2. The pixel 10 includes a photoelectric conversion unit such as a photodiode (PD), and converts the incident light L into electric charge. The reading unit 20 is provided for each of the pixels 10 and reads a signal (a photoelectric conversion signal) based on charge obtained by photoelectric conversion in the corresponding pixel 10. A reading control signal necessary for the reading unit 20 to read signals from the pixels 10 is supplied to the reading unit 20 from a scanning unit 260 of the second substrate 112. The signal read by the reading unit 20 is sent to the second substrate 112.

The second substrate 112 includes, for example, an A/D conversion unit 230 and the scanning unit 260. The A/D conversion unit 230 converts the signal output from the corresponding pixel 10 into a digital signal. The signal converted by the A/D conversion unit 230 is sent to the third substrate 113.

The scanning unit 260 generates a reading control signal for the reading unit 20 based on an instruction signal input via an input unit 290 of the fourth substrate 114. The instruction signal is sent from an image processing engine 30 which will be described below with reference to FIG. 4. The reading control signal generated by the scanning unit 260 is sent to the first substrate 111.

The third substrate 113 includes, for example, a memory 250, a computing unit 240, and an evaluation value storage unit 280. The memory 250 stores the digital signal converted by the A/D conversion unit 230. The memory 250 has a storage capacity capable of, for example, storing at least two frames of images generated on the basis of the digital signal converted by the A/D conversion unit 230. In the embodiment, one image is referred to as one frame image.

The computing unit 240 performs a predetermined computation using at least one of the digital signal stored in the memory 250 and the digital signal converted by the A/D conversion unit 230. An evaluation value for an image is calculated through the computation. The evaluation value indicates any one of, for example, a focus adjustment state of the image-capturing optical system 2, a brightness of an image generated on the basis of the digital signal, and a movement state of a main subject. The computing unit 240 can determine superiority or inferiority of a plurality of images on the basis of the calculated evaluation value.

The evaluation value storage unit 280 stores a reference value for objectively evaluating the evaluation value calculated by the computing unit 240. The reference value is recorded in advance in the evaluation value storage unit 280.

Since the evaluation value storage unit 280 is used in second and third embodiments, it may be omitted in the first embodiment.

The fourth substrate 114 includes, for example, an output unit 270 and an input unit 290. The output unit 270 sends the digital signal stored in the memory 250 or the digital signal converted by the A/D conversion unit 230 to the image processing engine 30 (FIG. 4) which will be described below.

For example, when the data of the image for recording which will be described below is sent to the image processing engine 30, the digital signal stored in the memory 250 is sent to the image processing engine 30 as the data of the image for recording. Furthermore, when the data of the image for monitor display which will be described below is sent to the image processing engine 30, the digital signal converted by the A/D conversion unit 230 is sent to the image processing engine 30 as the data of the image for monitor display.

An instruction signal from the image processing engine 30 is input to the input unit 290 via the input unit 290 of the fourth substrate 114. The instruction signal is sent to the second substrate 112.

<Imaging Element and Image Processing Engine>

Figure 4:
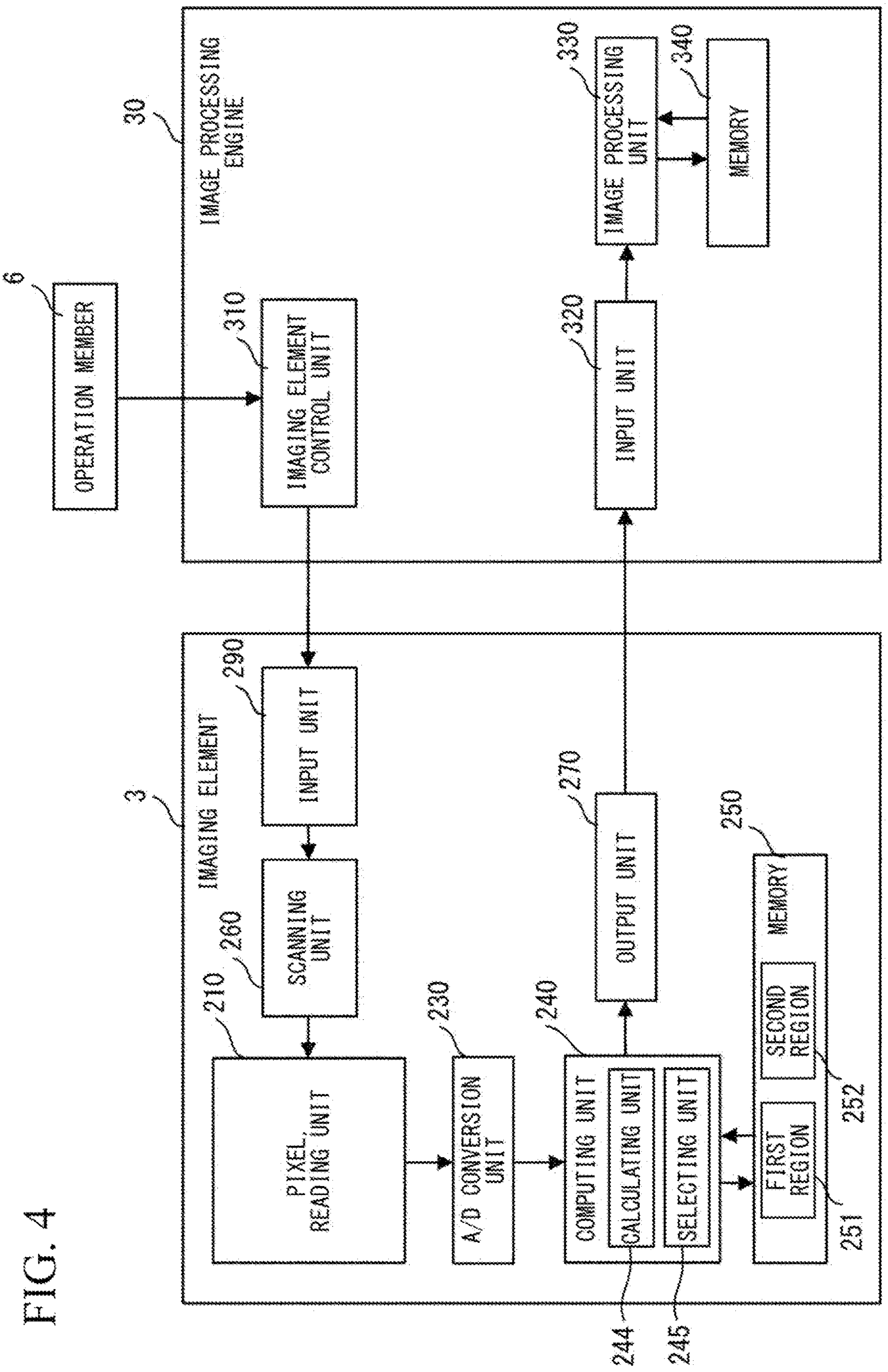
FIG. 4 is a schematic diagram illustrating data exchange between an imaging element and an image processing engine according to a first embodiment.

FIG. 4 is a schematic diagram illustrating data exchange between the imaging element 3 and the image processing engine 30 according to the first embodiment. For example, when an image-capturing instruction for recording is input from the image processing engine 30, the imaging element 3 captures a plurality of images while the image-capturing instruction continues, selects an excellent image from among the plurality of images on the basis of the evaluation value, and sends the data of the selected image to the image processing engine 30 as the data of the image for recording. Further, when an image-capturing instruction for monitor display is input from the image processing engine 30, the imaging element 3 repeatedly captures the image for monitor display, and sends data of the captured image to the image processing engine 30 as the image (also, referred to as a through image or a live view image) data for monitor display.

The image processing engine 30 constitutes a part of the control unit 4 and includes an imaging element control unit 310, an input unit 320, an image processing unit 330, and a memory 340.

The operation member 6 including a release button, operation switch, or the like is provided on an exterior surface of the imaging device 1, for example. The operation member 6 sends an operation signal according to a user's operation to the imaging element control unit 310. The user instructs the imaging device 1 to capture an image, to set image-capturing conditions, and the like by operating the operation member 6.

When the imaging element control unit 310 receives an instruction to set the image-capturing conditions, and the like, it sends information indicating the set image-capturing conditions to the imaging element 3. Further, when a half-press operation signal indicating that the release button has been half-pressed with a shorter stroke than in a full-press operation is input from the operation member 6, the imaging element control unit 310 sends an instruction signal instructing to start image-capturing for monitor display to the imaging element 3 in order to continuously display the image for monitor display on a display unit or a viewfinder (not shown).

Furthermore, when a full-press operation signal indicating that the release button has been fully pressed with a longer stroke than in the half-press operation is input from the operation member 6, the imaging element control unit 310 sends an instruction signal instructing to start image-capturing of a still image for recording to the imaging element 3.

The digital signal output from the imaging element 3 is input to the input unit 320. The input digital signal is sent to the image processing unit 330. The image processing unit 330 performs predetermined image processing on the digital signal acquired from the imaging element 3 to generate the data of an image. The generated data of the image for recording is recorded in the memory 340 or used for displaying a confirmation image after image-capturing. Further, the generated data of the image for monitor display is used for display on a viewfinder or the like. The data of the image recorded in the memory 340 can be recorded in the storage medium 5.

<Detailed Description of the Computing Unit>

In the first embodiment, the computing unit 240 of the imaging element 3 calculates an evaluation value indicating the focus adjustment state of the image-capturing optical system 2.

The pixels 10 forming the pixel array 210 of the imaging element 3 have a photoelectric conversion unit for image generation. However, in a part or the whole of a region corresponding to a focus point, a pixel 10 having a photoelectric conversion unit for focus detection instead of the photoelectric conversion unit for image generation is disposed.

Figure 5:
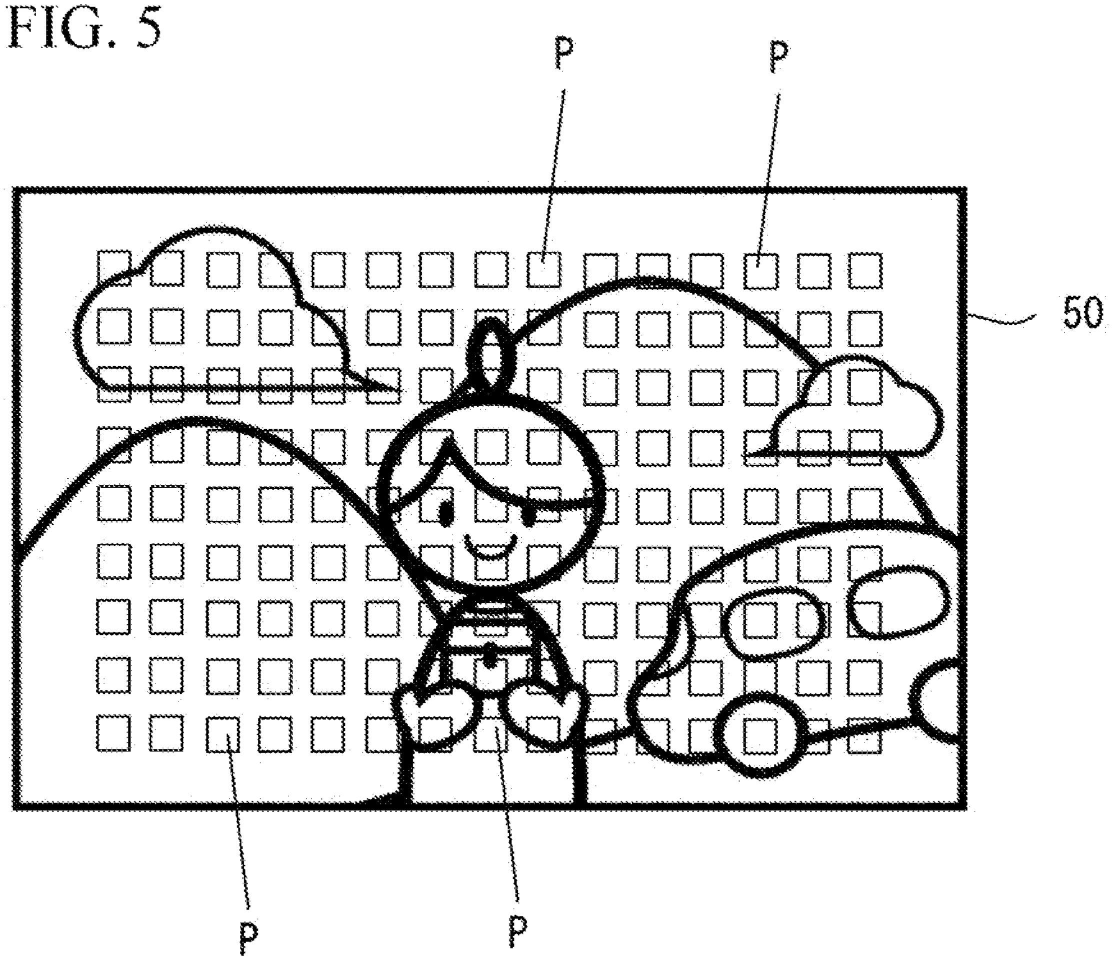
FIG. 5 is a diagram illustrating an image-capturing range of the imaging element.

The focus point will be described. FIG. 5 is a diagram illustrating a image-capturing range 50 captured by the imaging element 3. For example, a plurality of focus points Pare provided in the image-capturing range 50 in advance. In FIG. 5, the focus points P are illustrated together with a captured live view image.

The focus point P indicates a position in the image-capturing range 50 in which a focus of the image-capturing optical system 2 can be adjusted, and is also referred to as a focus detection area, a focus detection position, or a distance measuring point.

The illustrated number of focus points P and positions in the image-capturing range 50 are merely examples, and are not limited to the mode shown in FIG. 5.

A calculating unit 244 of the computing unit 240 calculates, as an evaluation value, an amount of image shift (a phase difference) between a pair of images caused by a pair of light fluxes passing through different regions of the image-capturing optical system 2, for example, based on a photoelectric conversion signal from a pixel 10 having a photoelectric conversion unit for focus detection. The amount of image shift can be calculated for each of the focus points P.

The amount of image shift between the pair of images is a value that is the basis for calculating an amount of defocus which is an amount of shift between a position of a subject image formed by the light flux passing through the image-capturing optical system 2 and a position of an imaging surface of the imaging element 3, and the amount of defocus can be calculated by multiplying the amount of image shift between the pair of images by a predetermined conversion coefficient.

For example, the calculating unit 244 sets the amount of image shift between the pair of images calculated at a focus point P located approximately at the center of the image-capturing range 50 among the plurality of focus points P as an evaluation value for the image.

The computing unit 240 may automatically select a focus point P to be used for calculating the amount of image shift between the pair of images (in other words, calculating the evaluation value) among all the focus points P. and may select the focus point P identified by the user's operation.

The calculating unit 244 calculates the evaluation value for each of a plurality of images captured while the image-capturing instruction for recording continues. A selecting unit 245 of the computing unit 240 selects an excellent image from among the plurality of images on the basis of the evaluation value. In the first embodiment, an image with the smallest amount of image shift between the pair of images, in other words, the image that is most in focus is selected. The data of the image selected by the selecting unit 245 is sent to the image processing engine 30 via the output unit 270.

Figure 6:
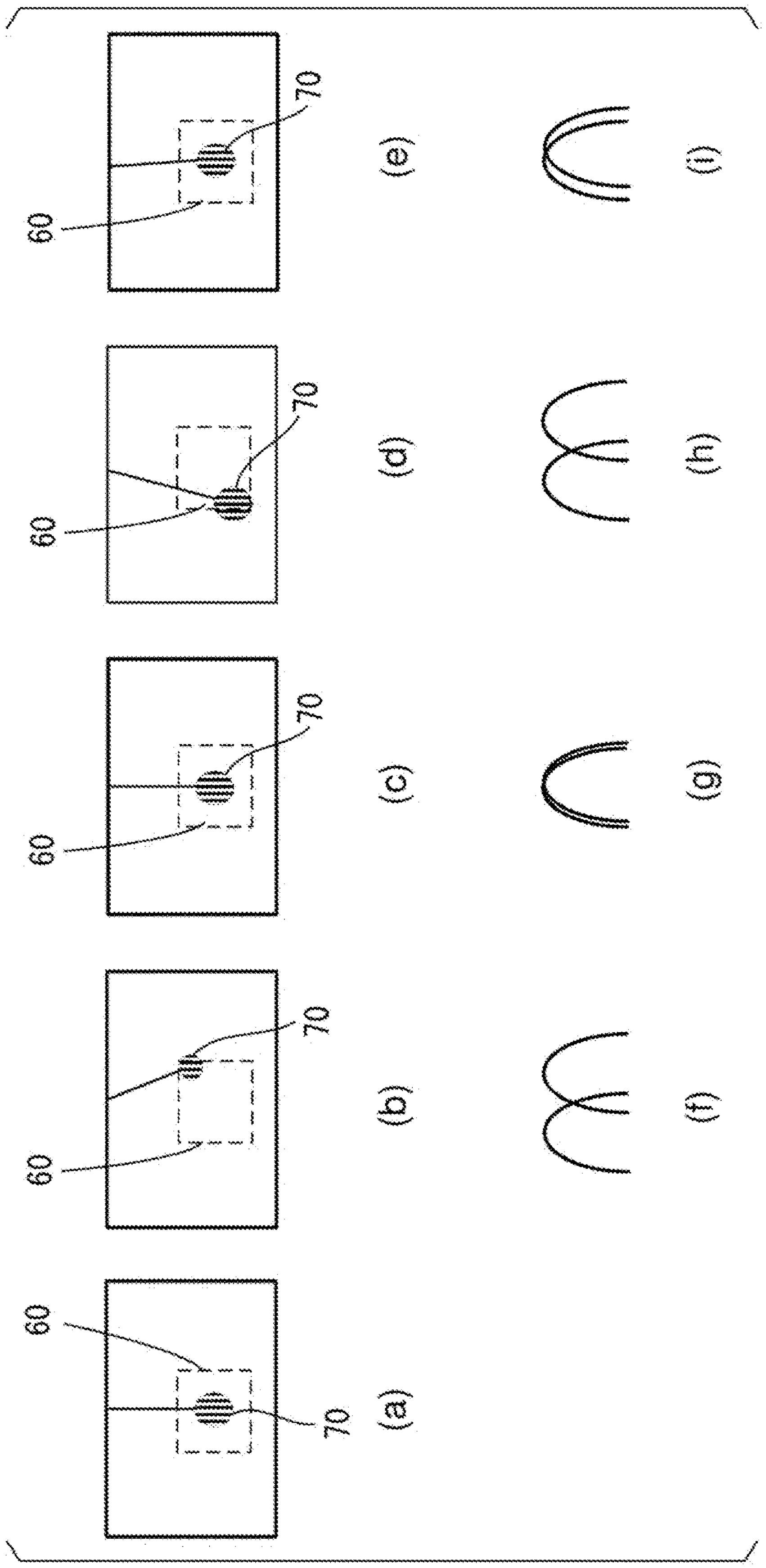
FIG. 6(*a*) is a diagram illustrating an image acquired during a half-press operation.

The processing performed by the computing unit 240 will be described in detail with reference to FIG. 6. FIGS. 6(*a*) to 6(*e*) are diagrams illustrating images captured by the pixel 10 having the photoelectric conversion unit for image generation. FIG. 6(*a*) is an example of an image obtained before the image-capturing instruction for recording is given, in other words, during the half-press operation. Further, FIGS. 6(*b*) to 6(*e*) are examples of images acquired while the image-capturing instruction for recording continues, in other words, during the full-press operation.

FIGS. 6(*f*) to 6(*i*) are diagrams schematically illustrating the amount of image shift between the pair of images acquired by the pixel 10 having the photoelectric conversion unit for focus detection when the image illustrated in FIGS. 6(*b*) to 6(*e*) are captured.

The pixel 10 having the photoelectric conversion unit for focus detection acquires a pair of images formed by a pair of light fluxes passing through different regions of the image-capturing optical system 2. When the image-capturing optical system 2 forms a sharp image at a predetermined focal plane, so-called focusing, the above-described pair of images relatively coincide with each other (a state in which the amount of shift is almost 0), as illustrated in FIG. 6(*g*). On the other hand, in a so-called front-focus state in which the image-capturing optical system 2 forms a sharp image before an intended focal plane, and in a so-called rear-focus state in which it forms a sharp image after the intended focal plane, the pair of images are relatively separated from each other and the amount of image shift becomes large, as illustrated in FIG. 6(*f*) or FIG. 6(*h*).

The computing unit 240 calculates the amount of image shift by performing known image shift detection calculation processing (correlation calculation processing, phase difference detection processing) on a signal train indicating the pair of images acquired by a plurality of pixels 10 having photoelectric conversion units for focus detection disposed side by side in the X-axis direction.

In FIG. 6(*a*), the user who performs the half-press operation on the release button prepares to photograph an object 70 suspended by a string using the imaging device 1, for example. It is assumed that the object 70 is swinging in the left-right direction and the depth direction of the drawing. The user prepares while holding the imaging device 1 so that the swinging object 70 is located approximately in the center of the image-capturing range. When the user performs the full-press operation, the imaging device 1 captures a plurality of images as illustrated in FIGS. 6(*b*) to 6(*e*) using the imaging element 3, while the full-press operation is being performed. In the embodiment, four images are captured.

In the embodiment, it is assumed that a region 60 in which the evaluation value is calculated by the computing unit 240 is set in advance approximately in the center of the image-capturing range. It is possible to reduce a burden of processing performed by the computing unit 240 to calculate the evaluation value by setting the region 60 as a part of the image-capturing range, compared to a case in which the region 60 is set as the whole of the image-capturing range. The computing unit 240 can automatically set the region 60 or set the region 60 to a range identified by a user's operation.

Data of a first image captured by the imaging element 3 during the full-press operation is stored in a first region 251 of the memory 250. Data of a second image captured by the imaging element 3 during the full-press operation is stored in a second region 252 of the memory 250. The data of the image stored in the memory 250 includes an image captured by the pixel 10 having the photoelectric conversion unit for image generation and the pair of images acquired by the pixel 10 having the photoelectric conversion unit for focus detection. The selecting unit 245 determines the superiority or inferiority of the first image and the second image based on the evaluation values calculated by the calculating unit 244 for the images stored in the first region 251 and the second region 252 of the memory 250. In the first image illustrated in FIG. 6(*b*), the object 70 is farther away in the depth direction, compared to the second image illustrated in FIG. 6(*c*). Therefore, as illustrated in FIG. 6(*f*), the pair of images corresponding to the first image are relatively apart from each other, compared to the pair of images (FIG. 6(*g*)) corresponding to the second image.

Since the amount of image shift between the pair of images shown in FIG. 6(*g*) is smaller than the amount of image shift between the pair of images shown in FIG. 6(*f*) (in other words, the evaluation value is higher), the selecting unit 245 selects the second image illustrated in FIG. 6(*c*). The computing unit 240 makes the data of the unselected images erasable. The reason why the data of the unselected image is made erasable is to store data of a next image in the same region of the memory 250. The computing unit 240 stores a third image captured next in the same region of the memory 250 in which the data of the image made erasable was stored. In the embodiment, the data is stored in the first region 251 of the memory 250 in which the data of the first image that was not selected was stored.

The selecting unit 245 determines the superiority or inferiority of the third image and the second image based on the evaluation values for the images stored in the first region 251 and the second region 252 of the memory 250. In the third image illustrated in FIG. 6(*d*), the object 70 is closer in the front direction than in the second image illustrated in FIG. 6(*c*). Therefore, as illustrated in FIG. 6(*h*), the pair of images corresponding to the third image are relatively apart from each other, compared to the pair of images (FIG. 6(*g*)) corresponding to the second image.

Since the amount of image shift between the pair of images shown in FIG. 6(*g*) is smaller than the amount of image shift between the pair of images shown in FIG. 6(*h*) (in other words, the evaluation value is higher), the selecting unit 245 selects the second image illustrated in FIG. 6(*c*).

The computing unit 240 makes the data of the unselected images erasable. The computing unit 240 stores a fourth image captured next in the same region of the memory 250 in which the data of the erasable image was stored. In the embodiment, the data is stored in the first region 251 of the memory 250 in which the data of the third image that was not selected was stored.

The selecting unit 245 determines the superiority or inferiority of the fourth image and the second image based on the evaluation values for the images stored in the first region 251 and the second region 252 of the memory 250. In the fourth image illustrated in FIG. 6(*e*), the object 70 is slightly farther away in the depth direction than in the second image illustrated in FIG. 6(*c*). Therefore, as illustrated in FIG. 6(*i*), the pair of images corresponding to the fourth image are relatively slightly apart from each other, compared to the pair of images (FIG. 6(*g*)) corresponding to the second image.

Since the amount of image shift between the pair of images shown in FIG. 6(*g*) is smaller than the amount of image shift between the pair of images shown in FIG. 6(*i*) (in other words, the evaluation value is higher), the selecting unit 245 selects the second image illustrated in FIG. 6(*c*).

As described above, when the data of the captured image is stored in the first region 251 or the second region 252 of the memory 250, the computing unit 240 of the imaging element 3 calculates an evaluation value for the image (the amount of image shift between the pair of images) using the calculating unit 244. Then, based on the calculated evaluation value, the selecting unit 245 selects one image in which the object 70 is most in focus among the four images captured by the imaging element 3 during the full-press operation. Only the data of the image selected by the selecting unit 245 is sent to the image processing engine 30 via the output unit 270.

The image processing engine 30 that has received the data of the image output from the imaging element 3 performs predetermined image processing in the image processing unit 330 to generate the data of the image for recording, and records it in the memory 340.

According to the first embodiment described above, the following effects can be obtained.

(1) The imaging element 3 includes a plurality of pixels 10 that output a signal based on charge obtained by photoelectric conversion, a calculating unit 244 that calculates an evaluation value of an image generated on the basis of the signals, a selecting unit 245 that selects one image from the plurality of images on the basis of the evaluation value of each of the plurality of images calculated by the calculating unit 244, and an output unit 270 that outputs data of the image selected by the selecting unit 245.

With such a configuration, an amount of the data of the image output from the imaging element 3 can be reduced compared to a case in which data for all of the plurality of images captured by the imaging element 3 is output from the imaging element 3 to the image processing engine 30. Thus, the processing time for outputting data and power consumption in the imaging element 3 can be reduced.

(2) The selecting unit 245 of the imaging element 3 selects one image with a highest evaluation value among the plurality of images. With such a configuration, the data of the image output from the imaging element 3 can be reduced to one image. Further, data of an image considered to be the best among the plurality of images on the basis of the evaluation value can be output to the image processing engine 30.

(4) The plurality of pixels 10 of the imaging element 3 photoelectrically convert light that has passed through the image-capturing optical system 2, and the calculating unit 244 calculates an evaluation value indicating a focus adjustment state of the image-capturing optical system 2.

With such a configuration, it is possible to output the data of the image that is most in focus among the plurality of images to the image processing engine 30.

(5) The calculating unit 244 of the imaging element 3 calculates an evaluation value on the basis of a signal corresponding to a predetermined region 60 of the image among the signals.

With such a configuration, compared to the case in which the evaluation value is calculated on the basis of the signals corresponding to the entire image-capturing range 50, a processing load on the calculating unit 244 for calculating the evaluation value can be reduced.

Second Embodiment

In the first embodiment, one image in which the object 70 is most in focus is selected among the plurality of images captured by the imaging element 3 during the full-press operation, and the data of the selected image is sent to the image processing engine 30. Instead, in the second embodiment, data of an image in which the object 70 is in focus is sent to the image processing engine 30 among a plurality of images captured by the imaging element 3 during the full-press operation. The number of images sent to the image processing engine 30 is not limited to one. Such a configuration will be described below.

<Imaging Element and Image Processing Engine>

Figure 7:
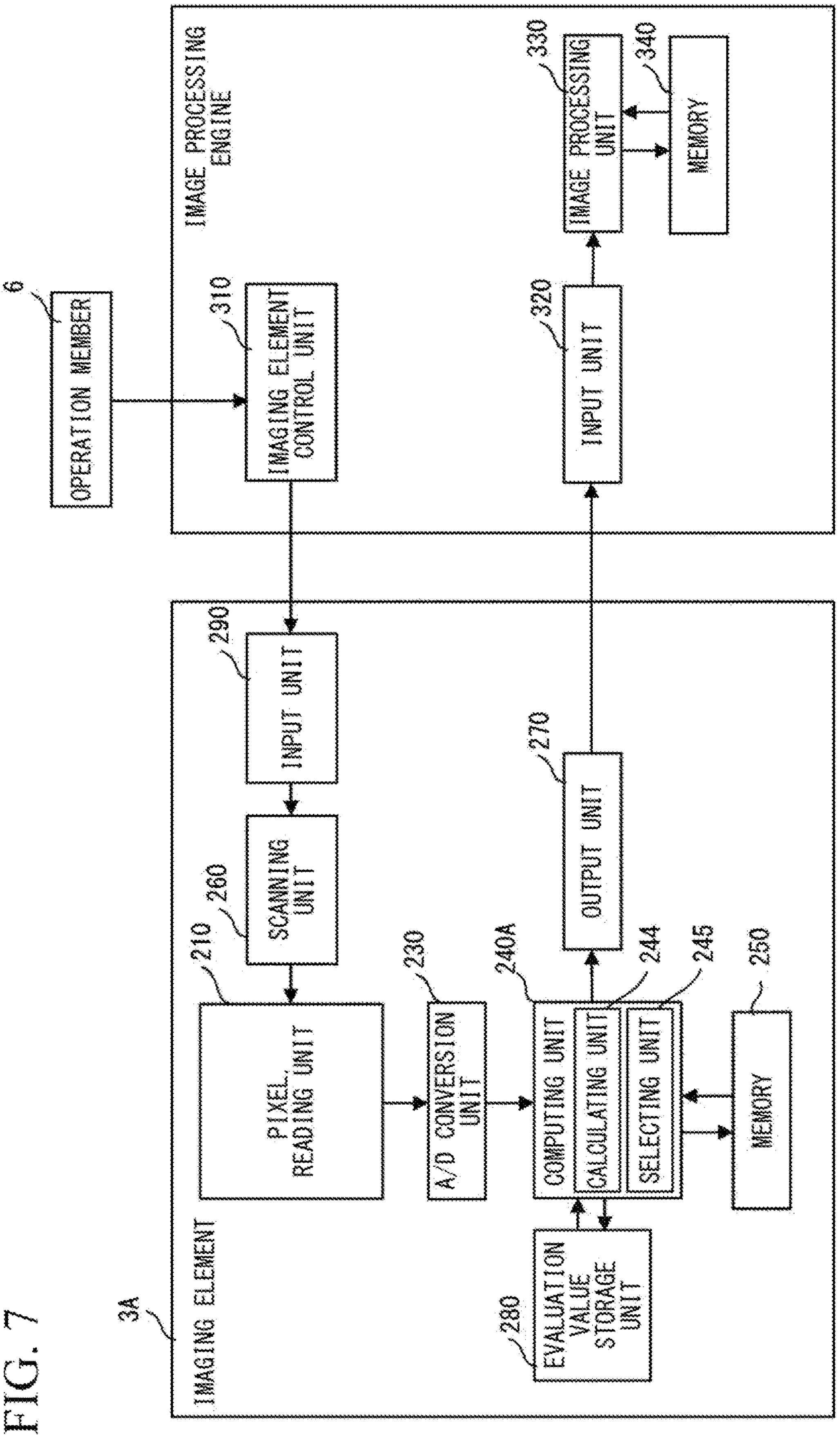
FIG. 7 is a schematic diagram illustrating data exchange between an imaging element and an image processing engine according to a second embodiment.

FIG. 7 is a schematic diagram illustrating data exchange between an imaging element 3A and an image processing engine 30 according to the second embodiment. The imaging element 3A is used in place of the imaging element 3 according to the first embodiment. The imaging element 3A differs from the imaging element 3 in that it includes a computing unit 240A and an evaluation value storage unit 280. Therefore, the description will focus on the differences, and the same components as the imaging element 3 will be given the same reference numerals as in FIG. 4, and the description will be omitted.

For example, when a image-capturing instruction for recording is input from the image processing engine 30, the imaging element 3A captures a plurality of images while the image-capturing instruction continues, and sends data of an image determined to be in focus on the object 70 among the plurality of images to the image processing engine 30 as the data of the image for recording.

As in the case of the imaging element 3, when an image-capturing instruction for monitor display is input from the image processing engine 30, images for monitor display are repeatedly captured, and data of the captured image is sent to the image processing engine 30 as the data of the image for monitor display.

<Detailed Description of the Computing Unit>

In the second embodiment, the computing unit 240A of the imaging element 3A calculates an evaluation value indicating a focus adjustment state of the image-capturing optical system 2. This evaluation value is the same as the evaluation value calculated by the computing unit 240 of the imaging element 3 according to the first embodiment.

The calculating unit 244 of the computing unit 240A calculates the evaluation value for each of a plurality of images captured while the image-capturing instruction for recording continues. The selecting unit 245 of the computing unit 240A compares a reference value recorded in advance in the evaluation value storage unit 280 and the evaluation value calculated by the calculating unit 244. The reference value is, for example, an allowable value for the amount of image shift between the pair of images. The selecting unit 245 selects an image of which a calculated evaluation value satisfies the reference value, in other words, the amount of image shift between the pair of images as the evaluation value is smaller than the amount of image shift corresponding to the reference value.

In the second embodiment, when the evaluation value for an image is higher than the reference value, in other words, when the evaluation value satisfies the reference value, the image is selected. The data of the image selected by the selecting unit 245 is sent to the image processing engine 30 via the output unit 270.

Figure 8:
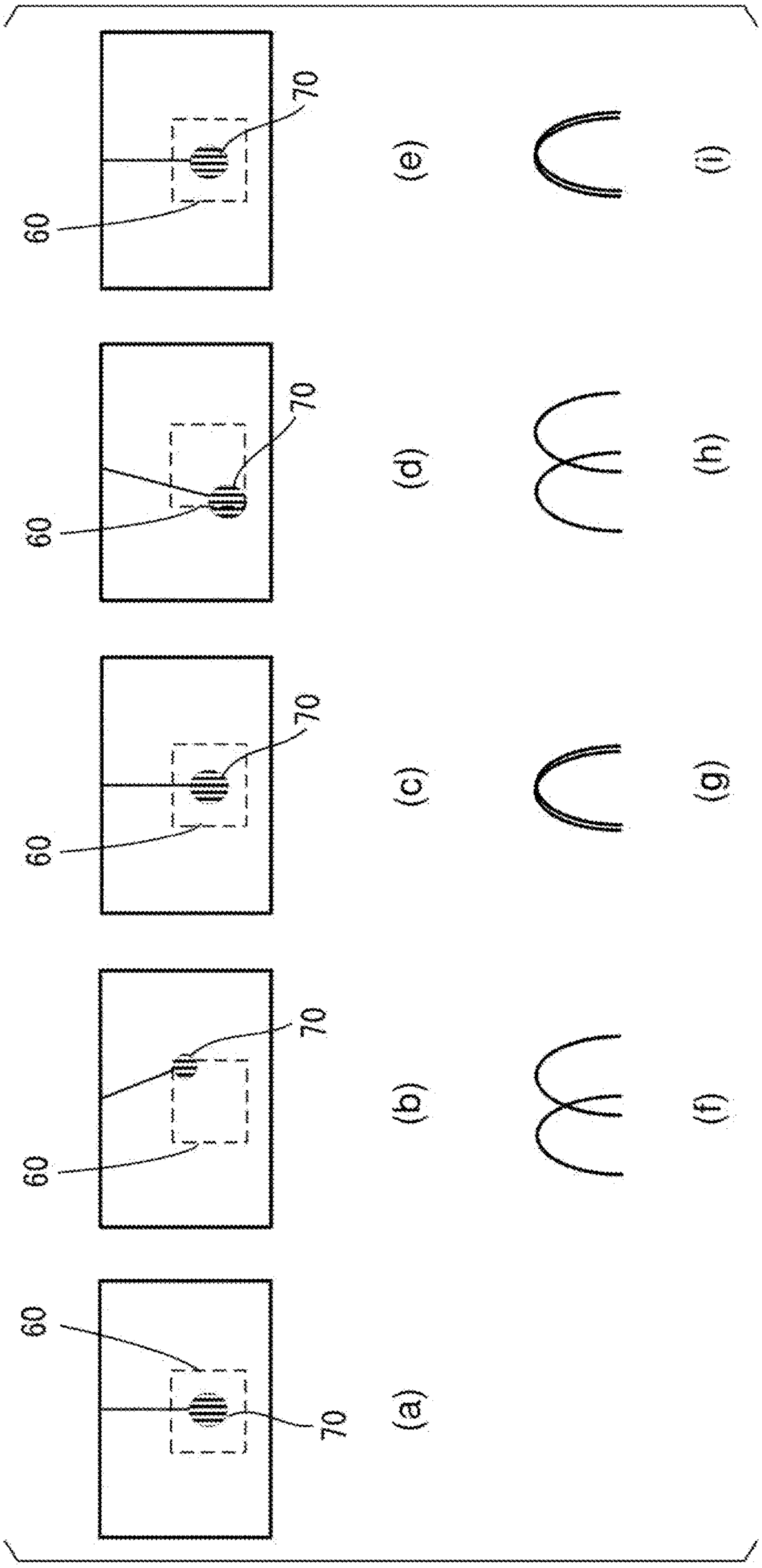
FIG. 8(*a*) is a diagram illustrating an image acquired during a half-press operation.

With reference to FIG. 8, the processing performed by the computing unit 240A will be described in detail. FIGS. 8(*a*) to 8(*e*) are diagrams illustrating images captured by the pixel 10 having the photoelectric conversion unit for image generation. FIG. 8(*a*) is an example of an image acquired before the image-capturing instruction for recording is given, in other words, during the half-press operation. Furthermore, FIGS. 8(*b*) to 8(*e*) are examples of images acquired while the image-capturing instruction for recording continues, in other words, during the full-press operation.

FIGS. 8(*f*) to 8(*i*) are diagrams schematically illustrating the amount of image shift between the pair of images acquired by the pixel 10 having the photoelectric conversion unit for focus detection when the image illustrated in FIGS. 8(*b*) to 8(*e*) are captured. The computing unit 240A calculates the amount of image shift between the pair of images, as in the computing unit 240 of the first embodiment.

In FIG. 8(*a*), the user who performs the half-press operation on the release button prepares to photograph an object 70 suspended by a string using the imaging device 1, for example. As in the first embodiment, the user prepares while holding the imaging device 1 so that the swinging object 70 is located approximately in the center of the image-capturing range. When the user performs the full-press operation, the imaging device 1 captures a plurality of images illustrated in FIGS. 8(*b*) to 8(*e*) using the imaging element 3A, while the full-press operation is being performed. In the embodiment, four images are captured.

Data of a first image captured by the imaging element 3A during the full-press operation is stored in a predetermined region of the memory 250. The data of the image stored in the memory 250 includes an image captured by the pixel 10 having the photoelectric conversion unit for image generation and a pair of images acquired by the pixel 10 having the photoelectric conversion unit for focus detection. The selecting unit 245 compares the evaluation value calculated by the calculating unit 244 for the first image with the reference value recorded in the evaluation value storage unit 280.

In the first image illustrated in FIG. 8(*b*), the object 70 is farther away in the depth direction. Therefore, as illustrated in FIG. 8(*f*), the pair of images corresponding to the first image are relatively apart from each other. For example, when the reference value is set to be equal to the amount of image shift between the pair of images shown in FIG. 8(*g*), it can be said that the evaluation value for the first image (FIG. 8(*b*)) does not satisfy the reference value.

Since the amount of image shift between the pair of images illustrated in FIG. 8(*f*) is larger than the amount of image shift corresponding to the reference value (in other words, the evaluation value does not satisfy the reference value), the selecting unit 245 does not select the first image illustrated in FIG. 8(*b*). The computing unit 240A makes the data of the first image erasable. The reason why the data of the first image is made erasable is to overwrite data of a second image in the same region of the memory 250.

The data of the second image captured by the imaging element 3A during the full-press operation is stored in the same region of the memory 250 in which the data of the image made erasable was stored. The selecting unit 245 compares the evaluation value for the second image with the reference value recorded in the evaluation value storage unit 280. As illustrated in FIG. 8(*g*), the pair of images corresponding to the second image (FIG. 8(*c*)) relatively coincide with each other (the amount of shift is approximately 0). When the reference value is set to be equal to the amount of image shift between the pair of images shown in FIG. 8(*g*), it can be said that the evaluation value for the second image (FIG. 8(*c*)) satisfies the reference value.

When the amount of image shift between the pair of images illustrated in FIG. 8(*g*) is smaller than or equal to the amount of image shift corresponding to the reference value (in other words, the evaluation value satisfies the reference value), the selecting unit 245 selects the second image illustrated in FIG. 8(*c*). The computing unit 240A sets the data of the second image selected by the selecting unit 245 as an output target. The computing unit 240A sends the data of the image as the output target to the image processing engine 30, and then makes the data of the second image illustrated in FIG. 8(*c*) erasable.

Data of a third image captured by the imaging element 3A during the full-press operation is stored in the same region of the memory 250 in which the data of the image made erasable was stored. The selecting unit 245 compares an evaluation value for the third image with the reference value recorded in the evaluation value storage unit 280.

In the third image illustrated in FIG. 8(*d*), the object 70 is approaching in the front direction. Therefore, as illustrated in FIG. 8(*h*), the pair of images corresponding to the third image are relatively apart from each other. When the reference value is set to be equal to the amount of image shift between the pair of images shown in FIG. 8(*g*), it can be said that the evaluation value for the third image does not satisfy the reference value.

Since the amount of image shift between the pair of images illustrated in FIG. 8(*h*) is larger than the amount of image shift corresponding to the reference value (in other words, the evaluation value does not satisfy the reference value), the selecting unit 245 does not select the third image illustrated in FIG. 8(*d*). The computing unit 240A makes the data of the third image erasable.

Data of a fourth image captured by the imaging element 3A during the full-press operation is stored in the same region of the memory 250 in which the data of the image made erasable was stored. The selecting unit 245 compares an evaluation value for the fourth image with the reference value recorded in the evaluation value storage unit 280. As illustrated in FIG. 8(*i*), a pair of images corresponding to the fourth image (FIG. 8(*d*)) relatively coincide with each other (the amount of shift is approximately 0). When the reference value is set to be equal to the amount of image shift between the pair of images shown in FIG. 8(*g*), it can be said that the evaluation value for the fourth image (FIG. 8(*d*)) satisfies the reference value.

When the amount of image shift between the pair of images illustrated in FIG. 8(*i*) is smaller than or equal to the amount of image shift corresponding to the reference value (in other words, the evaluation value satisfies the reference value), the selecting unit 245 selects the fourth image illustrated in FIG. 8(*d*). The computing unit 240A sets the data of the fourth image selected by the selecting unit 245 as an output target. The computing unit 240A sends the data of the image as the output target to the image processing engine 30, and then makes the data of the fourth image illustrated in FIG. 8(*d*) erasable.

As described above, when data of a captured image is stored in a predetermined region of the memory 250, the computing unit 240A of the imaging element 3A calculates an evaluation value for the image (the amount of image shift between the pair of images) using the calculating unit 244. Then, when the calculated evaluation value satisfies the reference value recorded in the evaluation value storage unit 280, the image is selected by the selecting unit 245. Only the data of the image selected by the selecting unit 245 is sent to the image processing engine 30 via the output unit 270.

The image processing engine 30 that has received the data of the image output from the imaging element 3A performs predetermined image processing in the image processing unit 330 to generate the data of the image for recording, and records it in the memory 340.

According to the second embodiment described above, the following effects can be obtained.

(1) The imaging element 3A includes a plurality of pixels 10 that output a signal based on charge obtained by photoelectric conversion, a calculating unit 244 that calculates an evaluation value of an image generated on the basis of the signals, a selecting unit 245 that selects at least one image from the plurality of images on the basis of the evaluation value of each of the plurality of images calculated by the calculating unit 244, and an output unit 270 that outputs data of the image selected by the selecting unit 245.

With such a configuration, an amount of data of the image output from the imaging element 3A can be reduced compared to a case in which data for all of the plurality of images captured by the imaging element 3A is output from the imaging element 3A to the image processing engine 30. Thus, the processing time for outputting data and power consumption in the imaging element 3A can be reduced.

(2) The selecting unit 245 of the imaging element 3A selects an image of which an evaluation value exceeds a predetermined value among the plurality of images. With such a configuration, the amount of data of the image output from the imaging element 3A can be reduced compared to a case in which data of all the images is output. Further, data of an image of which an evaluation value is higher than a predetermined value (in other words, it satisfies the reference value) among the plurality of images can be output to the image processing engine 30.

(3) The plurality of pixels 10 of the imaging element 3A photoelectrically convert light that has passed through the image-capturing optical system 2, and the calculating unit 244 calculates an evaluation value indicating a focus adjustment state of the image-capturing optical system 2.

With such a configuration, it is possible to output data of an image that is in focus to a certain extent among the plurality of images to the image processing engine 30.

(4) The calculating unit 244 of the imaging element 3A calculates an evaluation value on the basis of a signal corresponding to a predetermined region 60 of the image among the above signals.

With such a configuration, compared to a case in which the evaluation value is calculated on the basis of signals corresponding to the entire image-capturing range 50, the processing load on the calculating unit 244 for calculating the evaluation value can be reduced.

Third Embodiment

In a third embodiment, data of an image in which movement of a subject in the image is small among a plurality of images captured by the imaging element 3 during a full-press operation is sent to the image processing engine 30. The number of images sent to the image processing engine 30 is not limited to one. Such a configuration will be described below.

<Imaging Element and Image Processing Engine>

Figure 9:
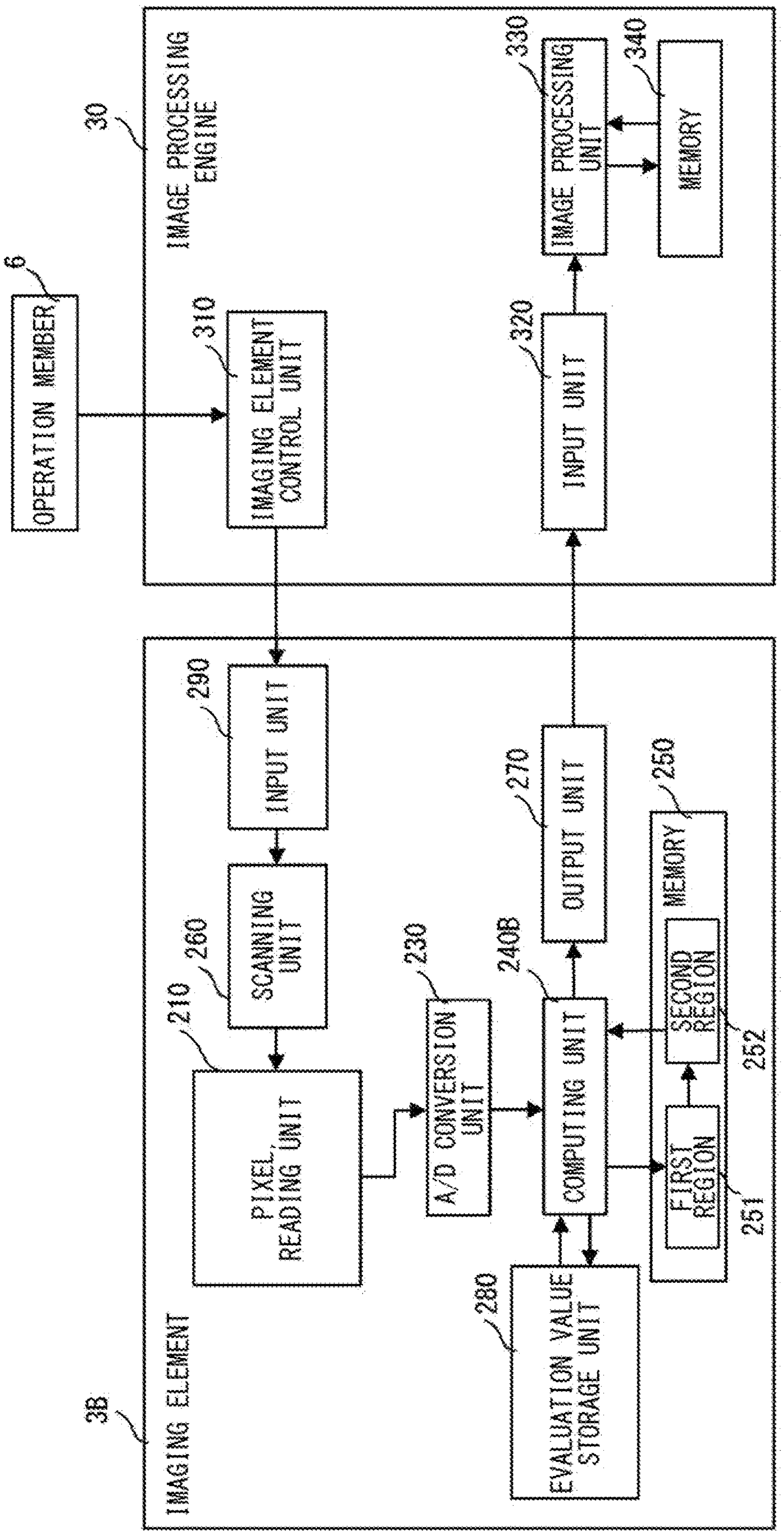
FIG. 9 is a schematic diagram illustrating data exchange between an imaging element and an image processing engine according to a third embodiment.

FIG. 9 is a schematic diagram illustrating data exchange between an imaging element 3B and the image processing engine 30 according to the third embodiment. The imaging element 3B is used in place of the imaging element 3 according to the first embodiment or the imaging element 3A according to the second embodiment. The imaging element 3B differs from the imaging elements 3 and 3A in that it includes a computing unit 240B. Therefore, the description will focus on the differences, and the same components as the imaging elements 3 and 3A will be given the same reference numerals as in FIGS. 4 and 7, and the description will be omitted.

For example, when an image-capturing instruction for recording is input from the image processing engine 30, the imaging element 3B captures a plurality of images while the image-capturing instruction continues, and sends data of an image in which a main subject has little movement among the plurality of images, in other words, it can be estimated that image blur of the main subject is small, to the image processing engine 30 as the data of the image for recording.

As in the imaging elements 3 and 3A, when an image-capturing instruction for monitor display is input from the image processing engine 30, an image for monitor display is repeatedly captured, and data of the captured image is sent to the image processing engine 30 as the data of the image for monitor display.

<Detailed Description of the Computing Unit>

In the third embodiment, the computing unit 240B of the imaging element 3B calculates an evaluation value indicating a magnitude of the movement of the main subject. This evaluation value is based on a difference in data of images captured before and after among the plurality of images.

The computing unit 240B calculates an evaluation value for each of the plurality of images captured while the image-capturing instruction for recording continues. The calculation of the evaluation value is performed by a calculating unit 244 which will be described below with reference to FIG. 11. The computing unit 240B compares the reference value recorded in advance in the evaluation value storage unit 280 with the evaluation value calculated by the calculating unit 244. The comparison of the evaluation value is performed by a selecting unit 245 which will be described below with reference to FIG. 11. The selecting unit 245 selects an image of which a calculated evaluation value satisfies the reference value, in other words, of which the evaluation value is smaller than the reference value. The data of the image selected by the selecting unit 245 is sent to the image processing engine 30 via the output unit 270.

Figure 10:
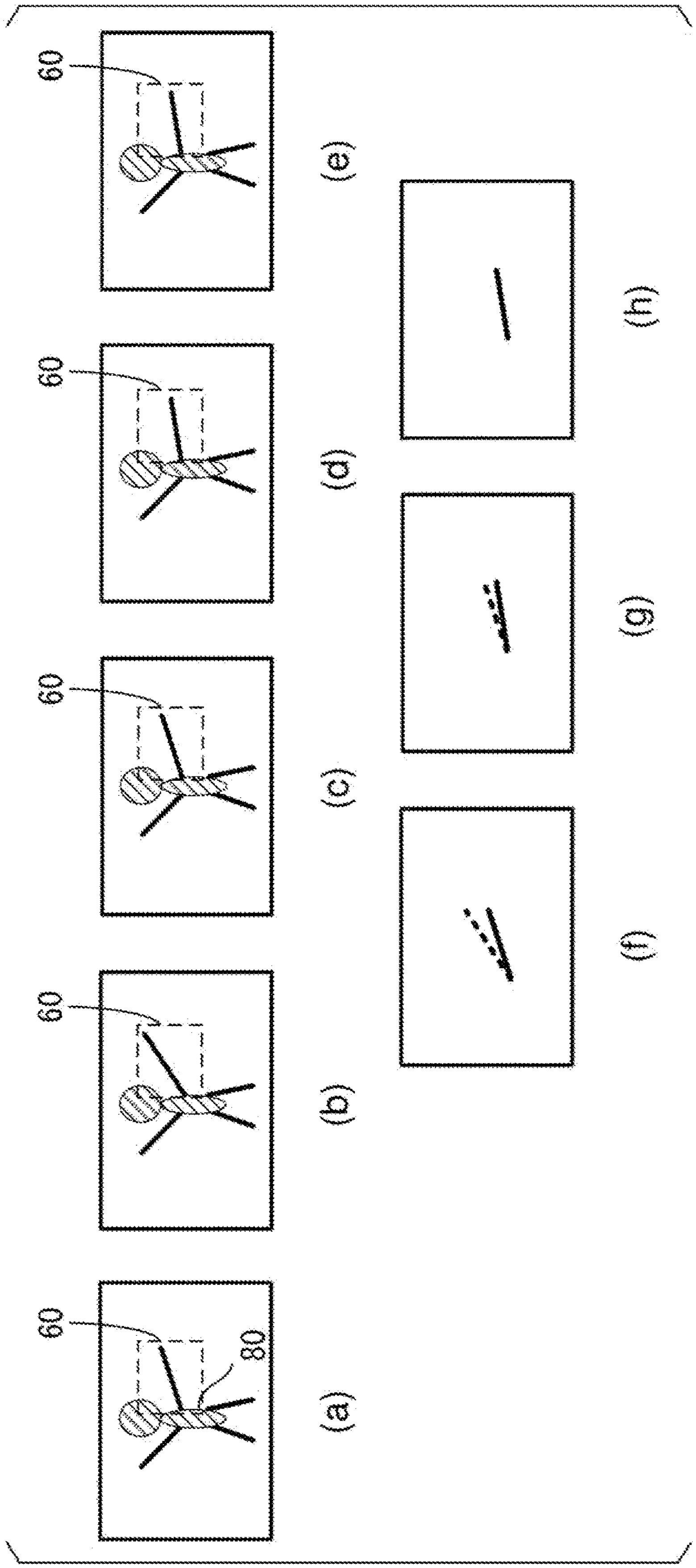
FIG. 10(*a*) is a diagram illustrating an image acquired during a half-press operation.

With reference to FIG. 10, the processing performed by the computing unit 240B will be described in detail. FIGS. 10(*a*) to 8(*e*) are diagrams illustrating images captured by a pixel 10 having a photoelectric conversion unit for image generation. FIG. 10(*a*) is an example of an image acquired before an image-capturing instruction for recording is given, in other words, during a half-press operation. Furthermore, FIGS. 10(*b*) to 10(*e*) are examples of images acquired while the image-capturing instruction for recording continues, in other words, during a full-press operation.

FIG. 10(*f*) is a diagram schematically illustrating the difference in data of the images illustrated in FIG. 10(*b*) and FIG. 10(*c*) which were captured while the full-press operation was being performed. FIG. 10(*g*) is a diagram schematically illustrating the difference in data of the images illustrated in FIG. 10(*c*) and FIG. 10(*d*) which were captured while the full-press operation was being performed. FIG. 10(*h*) is a diagram schematically illustrating the difference in data of the images illustrated in FIG. 10(*d*) and FIG. 10(*e*) which were captured while the full-press operation was being performed.

In FIG. 10(*a*), the user who performs the half-press operation on the release button prepares to photograph a person 80 as the main subject with the imaging device 1. The user prepares while holding the imaging device 1 so that the person 80 is located approximately in the center of the image-capturing range. When the user performs the full-press operation, the imaging device 1 captures a plurality of images illustrated in FIGS. 10(*b*) to 10(*e*) using the imaging element 3B while the full-press operation is performed. In the embodiment, four images are captured.

Figure 11:
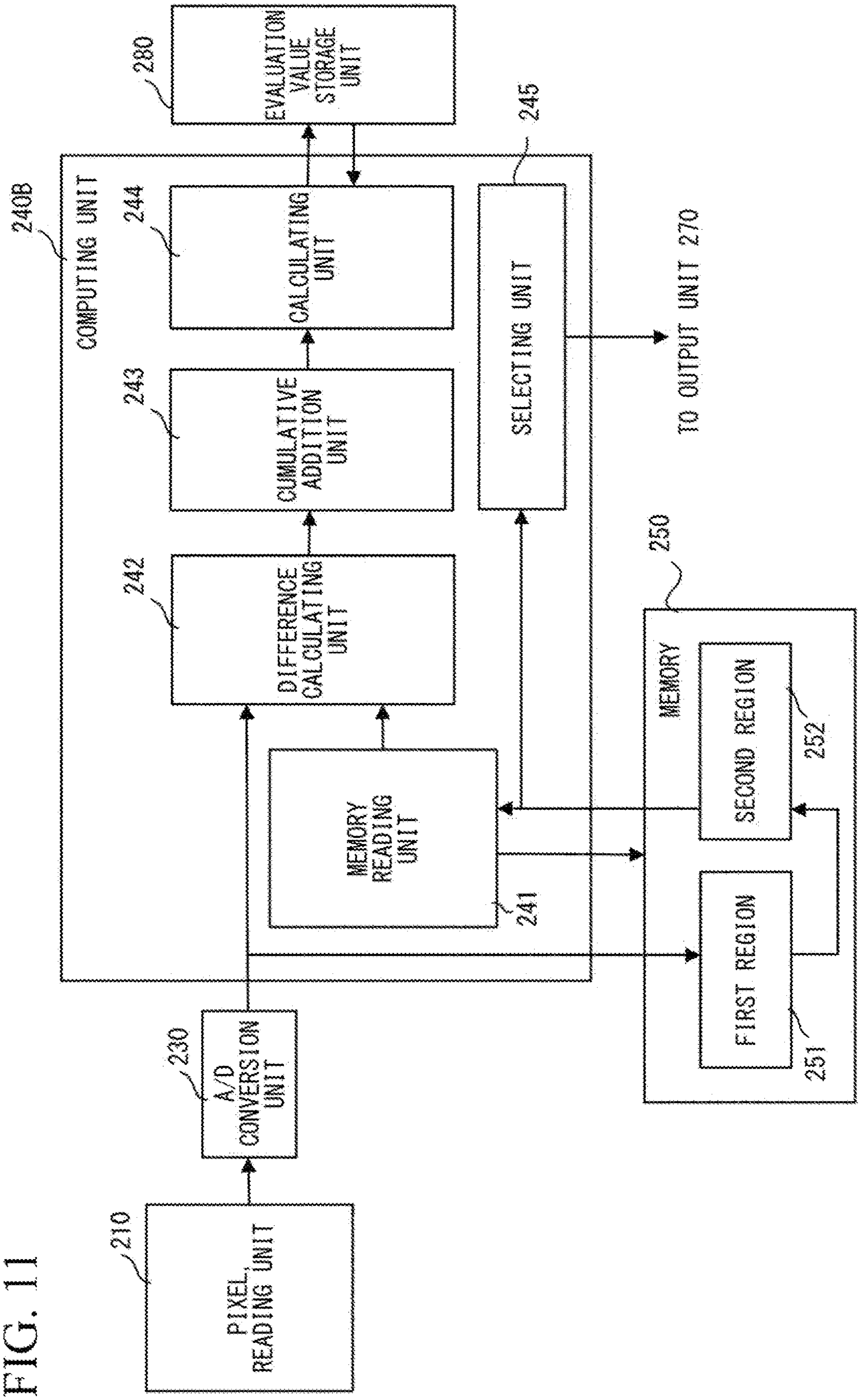
FIG. 11 is a diagram illustrating a configuration of a computing unit.

FIG. 11 is a diagram illustrating a configuration of the computing unit 240B. The computing unit 240B includes a memory reading unit 241 that reads data from the memory 250, a difference calculating unit 242, a cumulative addition unit 243, a calculating unit 244, and a selecting unit 245.

The computing unit 240B stores data of a first image (FIG. 10(*b*)) captured by the imaging element 3B during the full-press operation, for example, in a second region 252 of the memory 250. The computing unit 240B stores data of a second image (FIG. 10(*b*)) captured by the imaging element 3B during the full-press operation, for example, in a first region 251 of the memory 250.

The computing unit 240B calculates a difference between the data of the second image stored in the first region 251 of the memory 250 and the data of the first image stored in the second region 252 of the memory 250 for each of the corresponding pixels using the difference calculating unit 242. When such a calculation is performed, as illustrated in FIG. 10(*f*), a difference value calculated for the pixels included in a region in which there is movement in the image of the person 80 (the main subject) (in other words, a portion in which the person 80 moved between the first image and the second image) is large, and a difference value calculated for the pixels included in a region in which there is no movement in the image of the person 80 is small.

In the embodiment, it is assumed that a region in the subject image in which there is movement is set as a region 60 for which the computing unit 240B calculates the evaluation value. It is possible to reduce a burden of processing performed by the computing unit 240B to calculate the evaluation value by setting the region 60 as a part of an image-capturing range, compared to a case in which the region 60 is set in the entire image-capturing range. The computing unit 240B may automatically set the region 60 or set the region 60 to a range identified by a user's operation.

In the computing unit 240B, a plurality of difference values calculated for each of the pixels included in the region 60 is added by the cumulative addition unit 243. The calculating unit 244 sets a cumulative addition value calculated by the cumulative addition unit 243 as an evaluation value for the second image. The selecting unit 245 compares the evaluation value for the second image with the reference value recorded in the evaluation value storage unit 280.

For example, when the reference value is set to be equal to the difference illustrated in FIG. 10(*h*), it can be said that the evaluation value for the second image (FIG. 10(*c*)) does not satisfy the reference value.

Since the difference illustrated in FIG. 10(*f*) is larger than the difference corresponding to the reference value (in other words, the evaluation value does not satisfy the reference value), the selecting unit 245 does not select the first image illustrated in FIG. 10(*b*). The computing unit 240B makes the data of the first image erasable. The reason why the data of the first image is made erasable is to overwrite the data of the second image in the second region 252 of the memory 250.

The computing unit 240B stores data of a third image (FIG. 10(*d*)) captured by the imaging element 3B during the full-press operation in the first region 251 of the memory 250.

The computing unit 240B calculates a difference between the data of the third image stored in the first region 251 of the memory 250 and the data of the second image stored in the second region 252 of the memory 250 for each of the corresponding pixels using the difference calculating unit 242.

In the computing unit 240B, the plurality of difference values calculated for each of the pixels included in the region 60 are added by the cumulative addition unit 243. The calculating unit 244 sets the cumulative addition value calculated by the cumulative addition unit 243 as the evaluation value for the third image. The selecting unit 245 compares the evaluation value for the third image with the reference value recorded in the evaluation value storage unit 280.

As described above, when the reference value is set to be equal to the difference illustrated in FIG. 10(*h*), it can be said that the evaluation value for the third image (FIG. 10(*d*)) does not satisfy the reference value.

Since the difference illustrated in FIG. 10(*g*) is larger than the difference corresponding to the reference value (in other words, the evaluation value does not satisfy the reference value), the selecting unit 245 does not select the second image illustrated in FIG. 10(*c*). The computing unit 240B makes the data of the second image erasable. The reason why the data of the second image is made erasable is to overwrite the data of the third image in the second region 252 of the memory 250.

In this way, for the second and subsequent images captured by the imaging element 3B during the full-press operation, while the data of the newly captured image is stored in the first region 251 of the memory 250, a difference with the data of the image stored in the second region 252 of the memory 250 is calculated for each of the corresponding pixels by the difference calculating unit 242.

The computing unit 240B stores data of a fourth image (FIG. 10(*e*)) captured by the imaging element 3B during the full-press operation in the first region 251 of the memory 250.

The computing unit 240B calculates a difference between the data of the fourth image stored in the first region 251 of the memory 250 and the data of the third image stored in the second region 252 of the memory 250 for each of the corresponding pixels using the difference calculating unit 242.

In the computing unit 240B, the plurality of difference values calculated for each of the pixels included in the region 60 are added by the cumulative addition unit 243. The calculating unit 244 sets the cumulative addition value calculated by the cumulative addition unit 243 as the evaluation value for the fourth image. The selecting unit 245 compares the evaluation value for the fourth image with the reference value recorded in the evaluation value storage unit 280.

As illustrated in FIG. 10(*h*), the data of the third image and the data of the fourth image relatively coincide with each other (the difference value is approximately 0). When the reference value is set to be equal to the difference value illustrated in FIG. 10(*h*), it can be said that the evaluation value for the fourth image (10(*e*)) satisfies the reference value.

When the difference illustrated in FIG. 10(*h*) is smaller than or equal to the difference corresponding to the reference value (in other words, the evaluation value satisfies the reference value), the selecting unit 245 selects the fourth image illustrated in FIG. 10(*e*). The computing unit 240B sets the data of the fourth image selected by the selecting unit 245 as an output target. The computing unit 240B sends the data of the image as the output target to the image processing engine 30, and then makes the data of the sent fourth image erasable.

As described above, when a newly captured image is stored in the first region 251 of the memory 250, the computing unit 240B of the imaging element 3B calculates an evaluation value for the image (a cumulative addition value of the difference with the previously captured image) using the difference calculating unit 242, the cumulative addition unit 243, and the calculating unit 244. Then, when the calculated evaluation value satisfies the reference value recorded in the evaluation value storage unit 280, the image is selected by the selecting unit 245. Only the data of the image selected by the selecting unit 245 is sent to the image processing engine 30 via the output unit 270.

The image processing engine 30 that has received the data of the image output from the imaging element 3B performs predetermined image processing in the image processing unit 330 to generate the data of the image for recording, and records it in the memory 340.

According to the third embodiment described above, the following effects can be obtained.

(1) The imaging element 3B includes a plurality of pixels 10 that output a signal based on charge obtained by photoelectric conversion, a calculating unit 244 that calculates an evaluation value of an image generated on the basis of the signals, a selecting unit 245 that selects at least one image from the plurality of images on the basis of the evaluation value of each of the plurality of images calculated by the calculating unit 244, and an output unit 270 that outputs an image signal of the image selected by the selecting unit 245.

With such a configuration, an amount of the data of the image output from the imaging element 3B can be reduced compared to a case in which data for all of the plurality of images captured by the imaging element 3B is output from the imaging element 3B to the image processing engine 30. Thus, the processing time for outputting data and power consumption in the imaging element 3B can be reduced.

(2) The calculating unit 244 of the imaging element 3B calculates an evaluation value on the basis of a difference between images of a current frame and a previous frame, and the selecting unit 245 selects an image of which an evaluation value is less than a predetermined value among the plurality of images.

With such a configuration, an amount of the data of the image output from the imaging element 3B can be reduced compared to a case in which data for all of the plurality of images captured by the imaging element 3B is output from the imaging element 3B to the image processing engine 30. Thus, the processing time for outputting data and power consumption in the imaging element 3B can be reduced.

(3) The calculating unit 244 of the imaging element 3B calculates an evaluation value indicating the movement of the subject (for example, the person 80) appearing in the image. With such a configuration, for example, data of an image of the person 80 with less image blur among the plurality of images can be output to the image processing engine 30.

(4) The calculating unit 244 of the imaging element 3B calculates an evaluation value on the basis of a signal corresponding to the predetermined region 60 in the image among the above signals.

With such a configuration, compared to a case in which the evaluation value is calculated on the basis of signals corresponding to the entire image-capturing range 50, the processing load on the calculating unit 244 for calculating the evaluation value can be reduced.

Modified Example 1

In the first to third embodiments described above, the examples in which the imaging elements 3, 3A, and 3B have a back-side illuminated configuration have been described. Instead, each of the imaging elements 3, 3A, and 3B may have a front-side illuminated configuration in which the wiring layer 140 is provided on the incident surface side on which light is incident.

Modified Example 2

In the first to third embodiments described above, the examples in which a photodiode is used as the photoelectric conversion unit have been described. However, a photoelectric conversion film may be used as the photoelectric conversion unit.

Modified Example 3

The imaging elements 3, 3A, and 3B may be applied to a camera, a smartphone, a tablet, a camera built into a PC, a vehicle-mounted camera, and the like.

Modified Example 4

In the first to third embodiments described above, the examples in which an evaluation value indicating the focus adjustment state of the image-capturing optical system 2 or an evaluation value indicating the magnitude of movement of the main subject is calculated have been described. For example, a configuration in which an evaluation value indicating brightness of a photographed image, an evaluation value indicating a color temperature (also called white balance) of a photographed image, or an evaluation value indicating a contrast of a photographed image is calculated as an evaluation value that indicates information other than the focus adjustment state and the magnitude of movement of the main subject may be adopted. The selecting unit selects an image to be sent to the image processing engine 30 on the basis of the calculated evaluation value.

Modified Example 5

In the first to third embodiments described above, for example, the examples in which a plurality of images are captured by the imaging element 3, 3A, or 3B while the full-press operation is performed on the release button, and an image to be sent from the imaging element 3, 3A, or 3B to the image processing engine 30 is selected among the plurality of images on the basis of the evaluation value calculated for each of the images has been described. Selecting an image to be sent from the imaging element 3, 3A, or 3B to the image processing engine 30 among the plurality of images is not limited to the case in which the full-press operation is continuously performed on the release button, and may also be applied to, for example, a case in which the imaging device 1 automatically starts image-capturing, such as a case in which an image-capturing setting of capturing a plurality of images at a predetermined time is set in the imaging device 1, a case in which an image-capturing setting of capturing a plurality of images when a subject moves to a predetermined region within the image-capturing range 50 is set in the imaging device 1, and a case in which an instruction to start image-capturing is sent to the imaging device 1 from an external device.

Modified Example 6

In the first to third embodiments described above, the examples in which the same image-capturing conditions are applied to the plurality of images captured by the imaging element 3, 3A, or 3B without particularly changing the image-capturing conditions have been described. The image-capturing conditions include, for example, a shutter speed, an aperture value, ISO sensitivity, and the like. Instead, when a plurality of images are captured by the imaging element 3, 3A, or 3B, bracket image-capturing in which the images are captured while at least some of the imaging conditions are changed stepwise may be performed. In Modified example 6, the image to be sent from the imaging element 3, 3A, or 3B to the image processing engine 30 is selected among a plurality of images that are bracket-captured.

Modified Example 7

As a modified example of the third embodiment described above, a third region may be secured in the memory 250 described in the third embodiment, and data of an image newly captured by the imaging element 3B (referred to as data A) may be stored in the third region. In Modified example 7, the first region 251 and the second region 252 of the memory 250 respectively store data (referred to as data A-) of a thinned image in which the number of data is reduced by thinning out the data A at a predetermined thinning rate and store data (referred to as data B-) of a thinned image in which the number of data is reduced by thinning out the data (referred to as data B) of an image captured before the data A by the imaging element 3B at the same thinning rate as the data A.

The computing unit 240B calculates an evaluation value (a value obtained by cumulatively adding differences in data) for an image newly captured by the imaging element 3B (an image of which data is stored in the third region of the memory 250) on the basis of the data A- and the data B-stored in the first region 251 and the second region of the memory 250, and sends the data of the image stored in the third region of the memory 250 to the image processing engine 30 when the calculated evaluation value satisfies the reference value recorded in the evaluation value storage unit 280.

In Modified example 7 described above, the thinning rate of the data of the images to be respectively stored in the first region 251 and the second region 252 is set so that the sum of storage capacities of the first region 251 and the second region 252 of the memory 250 is smaller than a storage capacity of the third region of the memory 250. With such a configuration, the storage capacity of the memory 250 (the sum of the first region 251, the second region 252, and the third region) required in Modified example 7 can be curbed to be smaller than the storage capacity of the memory 250 (the sum of the first region 251 and second region 252) required in the third embodiment.

Although various embodiments and modified examples have been described above, the present invention is not limited thereto. A mode in which the configurations shown in the embodiments and modified examples are used in combination is also included within the scope of the present invention. Other modes considered within the technical spirit of the present invention are also included within the scope of the present invention.

REFERENCE SIGNS LIST

1 Imaging device
3, 3A, 3B Imaging element
4 Control unit
10 Pixel
20 Reading unit
30 Image processing engine
60 Region
210 Pixel array
240, 240A, 240B Computing unit
244 Calculating unit
245 Selecting unit
250 Memory
251 First region
252 Second region
260 Scanning unit
270 Output unit
280 Evaluation value storage unit

The invention claimed is:

1. An imaging element comprising a plurality of stacked substrates, the plurality of stacked substrates including:

a first substrate including a first pixel for detecting focus of an optical system and a second pixel for generating an image;

a second substrate including (i) a first conversion unit configured to convert into digital signals (a) first signal output from the first pixel during a first period and (b) a second signal output from the first pixel during a second period subsequent to the first period, and (ii) a second conversion unit that converts into digital signals (a) a third signal output from the second pixel during the first period and (b) a fourth signal output from the second pixel during the second period; and a third substrate including a computing unit configured to control output of at least one of the third signal converted into a digital signal by the second conversion unit and the fourth signal converted into a digital signal by the second conversion unit, based on a first evaluation value obtained using the first signal converted into a digital signal by the first conversion unit and a second evaluation value obtained using the second signal converted into a digital signal by the first conversion unit, wherein the second substrate is disposed between the first substrate and the third substrate in a lamination direction of the first, second, and third substrates.

2. The imaging element according to claim 1, wherein the computing unit includes a calculating unit that calculates the first evaluation value and the second evaluation value.

3. The imaging element according to claim 2, wherein the computing unit includes a selecting unit that causes at least one of the third and fourth signals converted into digital signals by the second conversion unit to be output, based on the first and second evaluation values calculated by the calculating unit.

4. The imaging element according to claim 1, wherein, based on the first and second evaluation values, the computing unit outputs one of the third and fourth signals converted into digital signals by the second conversion unit, and does not output the other of the third and fourth signals.

5. The imaging element according to claim 4, wherein the computing unit erases the digital signal that was not output among the third and fourth signals converted into digital signals by the second conversion unit.

6. The imaging element according to claim 1, wherein the plurality of substrates further comprises a fourth substrate having an output unit for outputting externally the one signal output by the computing unit among the third and fourth signals converted into digital signals by the second conversion unit.

7. The imaging element according to claim 6, wherein the second substrate includes a scanning unit that supplies a first control signal for reading out the first signal and the third signal from the first pixel and the second pixel, and a second control signal for reading out the second signal and the fourth signal from the first pixel and the second pixel, and the fourth substrate includes an input unit to which an instruction signal for supplying the first and second control signals from the scanning unit is input.

8. The imaging element according to claim 1, wherein the second substrate includes a scanning unit that supplies a first control signal for reading out the first signal and the third signal from the first pixel and the second pixel, and a second control signal for reading out the second signal and the fourth signal from the first pixel and the second pixel.

9. The imaging element according to claim 8, wherein the scanning unit supplies the first and second control signals so that an imaging condition set during the first period and during the second period is different.

10. The imaging element according to claim 9, wherein the imaging condition is shutter speed.

11. The imaging element according to claim 9, wherein the imaging condition is ISO sensitivity.

12. The imaging element according to claim 1, wherein the third substrate includes a memory that stores at least one of the third and fourth signals that have been converted to digital signals by the second conversion unit.

13. The imaging element according to claim 12, wherein the memory stores the third and fourth signals converted into digital signals by the second conversion unit.

14. The imaging element according to claim 12, wherein the computing unit causes at least one of the third and fourth signals converted into digital signals by the second conversion unit to be output from the memory based on the first and second evaluation values.

15. The imaging element according to claim 1, wherein the computing unit controls output such that the signal among the third and fourth signals converted into digital signals by the second conversion unit that is determined to have a higher evaluation value based on comparison of the first and second evaluation values is output.

16. The imaging element according to claim 1, wherein the computing unit controls output such that the signal among the third and fourth signals converted into digital signals by the second conversion unit that is determined to have a higher evaluation value based on comparison of the first and second evaluation values with a predetermined reference value is output.

17. The imaging element according to claim 1, wherein the first and second evaluation values are evaluation values related to brightness of an imaged subject.

18. The imaging element according to claim 1, wherein the first and second evaluation values are evaluation values related to a focusing state of the optical system.

19. The imaging element according to claim 1, wherein the first and second evaluation values are evaluation values related to movement of an imaged subject.

20. The imaging element according to claim 1, further comprising a first connection unit for electrically connecting the first substrate and the second substrate, the first connection unit including conductive members disposed to face each other in the lamination direction.

21. The imaging element according to claim 20, further comprising a second connection unit for electrically connecting the second substrate and the third substrate, the second connection unit including a through-electrode penetrating the second substrate.

22. The imaging element according to claim 1, wherein the second pixel is aligned with the first pixel in a row direction.

23. The imaging element according to claim 22, wherein the second pixel is arranged adjacent to the first pixel in the row direction.

24. The imaging element according to claim 1, wherein the second pixel is aligned with the first pixel in a column direction.

25. The imaging element according to claim 24, wherein the second pixel is arranged adjacent to the first pixel in the column direction.

26. The imaging element according to claim 1, wherein the first substrate includes a third pixel for generating an image, and the second substrate includes a third conversion unit that converts into digital signals (i) a fifth signal output from a third pixel during the first period and (ii) a sixth signal output from the third pixel during the second period.

27. The imaging element according to claim 26, wherein the second pixel is aligned with the first pixel in a first direction.

28. The imaging element according to claim 27, wherein the second pixel is arranged adjacent to the first pixel in the first direction.

29. The imaging element according to claim 27, wherein the third pixel is aligned with the first pixel in the first direction.

30. The imaging element according to claim 29, wherein the third pixel is arranged adjacent to the first pixel in the first direction.

31. The imaging element according to claim 27, wherein the third pixel is aligned with the first pixel in a second direction that intersects the first direction.

32. The imaging element according to claim 31, wherein the third pixel is arranged adjacent to the first pixel in the second direction.

33. An imaging device comprising:

the imaging element according to claim 1; and a control unit that performs image processing on a signal that has been output from the imaging element by the computing unit, among the third and fourth signals converted into digital signals by the second conversion unit.

34. The imaging device according to claim 33, wherein the control unit performs image processing on the signal that has been output from the imaging element and does not perform image processing on a signal that has not been output from the imaging element by the computing unit, among the third and fourth signals converted into digital signals by the second conversion unit.

* * * * *